United States Patent [19]
Kuhn

[11] Patent Number: 5,819,601
[45] Date of Patent: Oct. 13, 1998

[54] GEARBOX, ESPECIALLY FOR A MOTOR VEHICLE

[75] Inventor: Walter Kuhn, Friedrichshafen, Germany

[73] Assignee: ZF Friedrichshafen AG, Friedrichshafen, Germany

[21] Appl. No.: 704,767
[22] PCT Filed: Mar. 25, 1995
[86] PCT No.: PCT/EP95/01131
  § 371 Date: Sep. 26, 1996
  § 102(e) Date: Sep. 26, 1996
[87] PCT Pub. No.: WO95/27158
  PCT Pub. Date: Oct. 12, 1995

[30] Foreign Application Priority Data

Mar. 30, 1994 [DE] Germany .......................... 44 11 114.2

[51] Int. Cl.$^6$ .................................................. F16H 37/04
[52] U.S. Cl. .................................................................. 74/745
[58] Field of Search ................................................ 74/745

[56] References Cited

U.S. PATENT DOCUMENTS

| | | | |
|---|---|---|---|
| 2,975,656 | 3/1961 | Haverlender | 74/745 |
| 3,937,313 | 2/1976 | Abbott . | |
| 3,991,634 | 11/1976 | Longshore | 74/745 |
| 4,116,090 | 9/1978 | Zenker | 74/745 |
| 4,132,133 | 1/1979 | Ballendux | 74/745 |
| 4,266,447 | 5/1981 | Heess et al. . | |
| 4,640,146 | 2/1987 | Buback | 74/745 |
| 4,706,519 | 11/1987 | Beim | 74/745 |
| 4,831,894 | 5/1989 | Braun | 74/745 |
| 4,856,375 | 8/1989 | Beim | 74/745 |
| 4,966,048 | 10/1990 | Braun | 74/745 |
| 5,125,282 | 6/1992 | Bender et al. | 74/745 |

FOREIGN PATENT DOCUMENTS

| | | |
|---|---|---|
| 29 21 169 | 1/1981 | Germany . |
| 657 228 | 9/1951 | United Kingdom . |
| 2 032 543 | 5/1980 | United Kingdom . |
| 2 096 251 | 10/1982 | United Kingdom . |

Primary Examiner—Dirk Wright
Attorney, Agent, or Firm—Davis and Bujold

[57] ABSTRACT

The invention concerns a transmission, especially for a motor vehicle, which is designed as group transmission (1). In order to utilize as fully as possible the traction-speed diagram, the transmission has five manually shiftable gears to which join two automatically engageable and disengageable overdrive gears. The group transmission (1) is formed by one synchronized transmission (2) and one powershift transmission (3). The proposed transmission stands out in particular by a light weight and small installation space at a low cost of production.

18 Claims, 4 Drawing Sheets

| GEAR | i | Phi | CLUTCH | | | GEARSHIFT MEMBER | | | |
|---|---|---|---|---|---|---|---|---|---|
| | | | A | B | C | D | E | F | G |
| 1. | 4.5 | | ● | | | | | ● | |
| 2. | 2.92 | 1.54 | | | ● | | | ● | |
| 3. | 1.9 | 1.53 | ● | | | | | | ● |
| 4. | 1.24 | 1.54 | | | ● | | | | ● |
| 5. | 1.0 | 1.24 | | | | ● | | | |
| 6. | 0.78 | 1.28 | | ● | | ● | | | |
| 7. | 0.65 | 1.2 | | | ● | ● | | | |
| R. | 3.85 | | ● | | | | ● | | |

FIG. 3

GEARBOX, ESPECIALLY FOR A MOTOR VEHICLE

The invention relates to a transmission, especially for a motor vehicle.

A transmission is known to perform the function of adapting as thoroughly as possible to each other the operating conditions between a prime mover and a motor vehicle. The different conditions of use of a motor vehicle (loading, unloading, city, land, expressway and mountain driving) require a large range of traction and speed. To utilize as fully as possible the traction-speed diagram, a transmission having at least four or more gears is required or desirable. The power train of a motor vehicle is, in general, designed so as to achieve the highest speed in the level road with a maximum engine power. The final speed and mileages depend on the tractional resistance of the motor vehicle. To achieve a high road speed without making allowance for disadvantages in mileage in the lower and medium speed ranges, it has become customary to use hand-operated transmissions with five gears.

Also known (GB-A 657 228) are transmissions with added speed levels (overdrive).

The overdrive can be designed so as to make it possible to drive in a consumption-optimated range by lowering the engine speed. Whether to utilize the intrinsic advantage of an overdrive depends to a great extent on the type of driver concerned. A driver not very inclined to shift will not as a rule make use of an existing overdrive.

DE-A 28 42 390 has disclosed an electronic gearchange mechanism for actuating an overdrive, which allows changing a gearshift pattern. In this manner, depending on whether an economy-or power-oriented mode of driving is desired, the driver of a motor vehicle can adjust the shifting conditions of the overdrive. Here, the overdrive is actuated by the driver by an additional switch in the gearshift lever, a contact in the transmission ensuring that it be possible to engage the overdrive only if the highest gear has been previously introduced.

DE-A 30 26 742 has disclosed a process for an engine contact when changing the gears of a stepped transmission. The stepped transmission is designed as a hand-operable transmission with an added overdrive. The overdrive is engaged and disengaged by an automatic transmission control according to vehicle parameters. The known suggestion concerns the engine contact when engaging or disengaging the overdrive in order to obtain a gearshift operation which is as smooth as possible. Nothing more detailed is said about the design of the stepped transmission itself.

DE-A 29 21 169 has also disclosed a multiple gear synchronized manually operated transmission which has four gears and an overdrive for the third and fourth gears. The gear wheels for the third and fourth gears are coordinated with an additional pair of gear wheels. Said pair of gear wheels are engaged and disengaged preferably by a hydraulically actuated multi-disc clutch. When the clutch is engaged and a third or fourth gear is shifted, the longer ratio of the pair of gear wheels is active. If the clutch is disengaged (when the accelerator is lowered), it is shifted down from the overdrive to the direct short ratio of the shifted third or fourth gear, which practically corresponds to a down shift to a lower gear.

In the above explained concept of a transmission, it is a disadvantage that the driver, in the absence of clear situations, no longer knows after some time whether he is driving, for example, in third gear or in third gear with overdrive engaged. He does not know whether or not to shift in certain situations. If, for example, the driver is going to shift from the third gear to the fourth gear, the overdrive of the third gear can engage unexpectedly. The deficient overview can result in the driver driving in the wrong gear for a long period of time.

The problem on which the invention is based is to provide a transmission with a large total ratio in which the lower gears can be manually operated in a manner familiar to the driver with additional overdrive gears which adhere to the highest gear. This transmission must stand out specially by a light weight and small installation space at low cost of production.

The problem on which the invention is based is solved by a transmission, specially for a motor vehicle, which is designed as a group transmission having a basis formed by a synchronized transmission having less than five gears and is complemented by a powershift transmission for form: one manually operable transmission having at least five gears and at least two overdrive gears which can be automatically engaged and disengaged when the highest gear is shifted. Such a group transmission reduces to a minimum the expense required for a manual transmission. For a 5-gear transmission with two additional overdrive gears, the synchronized transmission used as basis has only three gears. Three positive locked gearshift elements such as multi-disc clutches are inserted into the powershiftable part, one of said clutches being used as a starting clutch. This aspect of the transmission also allows the required expense to be reduced to a minimum. By virtue of the proposed combination of a synchronized transmission with a powershift transmission, the builder has the possibility of selecting seven adequate gears. The gear step to the lower gears is larger while it decreases in the upper gears. When the clutches used in the powershift transmission are designed as slip-adjusted clutches such as wet operating multi-disc clutches, this has the advantage that when torsional vibrations occur, torsion absorbers or a dual mass flywheel otherwise needed are not required. In spite of the large total ratios, the driver has clear situations, since the transmission appears to him, at least in what concerns the manual gearshift, as traditional 5-gear transmission. It is an absolute advantage here that the overdrive gears can only become active when the highest gear is shifted. Otherwise the driver is compelled in case of corresponding situations to downshift consciously from the highest to the lowest gear.

Other features essential to the invention and the advantages resulting therefrom are to be understood from the description that follows of several embodiments of the invention. In the drawings:

FIG. 3 is a summary, in table form, with the ratios, gear steps and gearshift conditions of the group transmission according to FIGS. 1 and 2.

Figure 1:
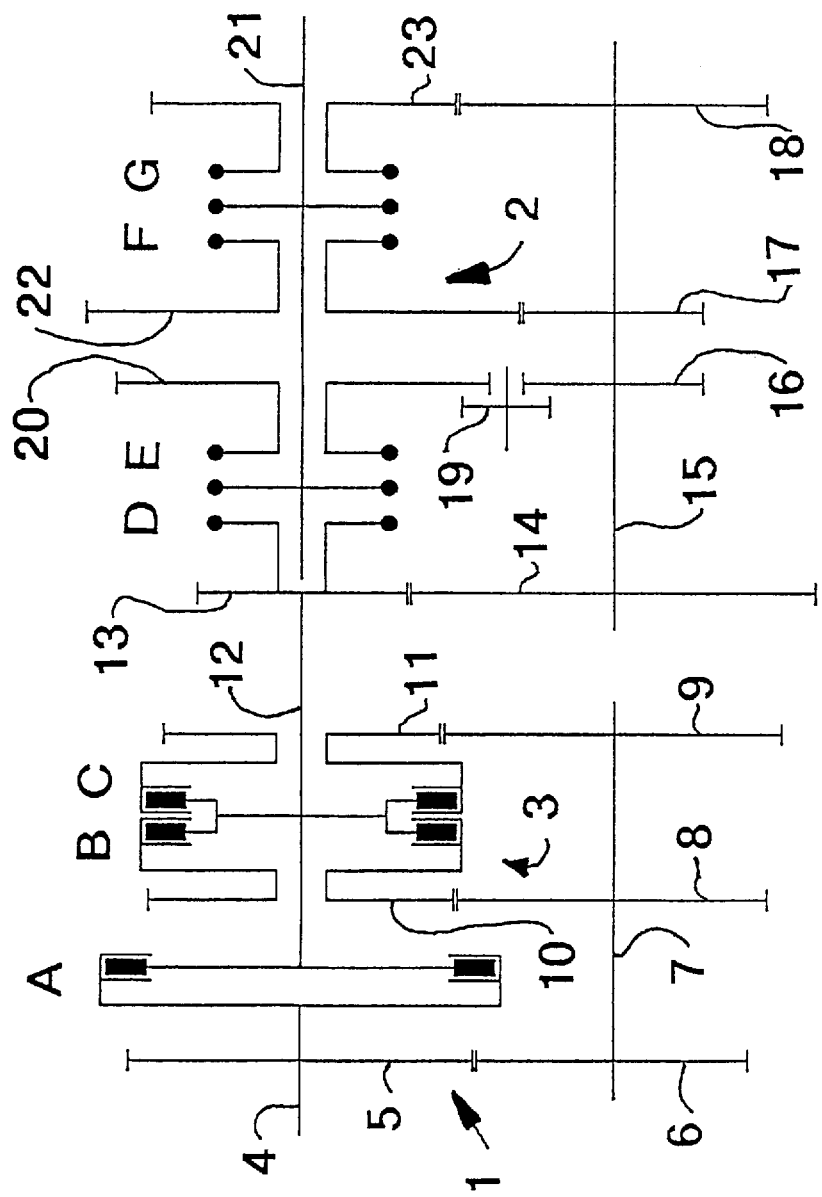
FIG. 1 is a transmission diagram of a first embodiment of a group transmission.

The group transmission diagrammatically reproduced in FIG. 1 is composed of one synchronized transmission 2 and one powershift transmission 3.

The general construction principle consists in the indication of using a synchronized transmission 2 having less than five gears, as a basis, and complementing it by a powershift transmission 3 to form a group transmission 1. Said group transmission must have at least five years to be manually shifted. The highest shiftable gear must be attached to at least two overdrive gears which can be engaged or disengaged according to specific operation parameters.

Gears 1 to 5 and the reverse gear can be manually selected by the driver via a gearshift lever—preferably in accordance with the usual gearshift pattern with three gearshift gates in which respective adjoining gears stand opposite.

The embodiment explained is a group transmission formed by a synchronized transmission 2 having three gears and a powershift transmission 3 also having three gears. From the possible number of nine gears, gears are selected that are adequate according to ratio and gear step, namely: five gears which can be manually shifted and two overdrive gears which join up with the highest gear and can be automatically engaged and disengaged.

An input shaft 4 is in driving connection with a motor-driven input itself not shown. The power flows over a head set consisting of fixed wheels 5 and 6 upon a countershaft 7.

Additional fixed wheels 8 and 9 are situated upon the countershaft 7 which are in permanent meshing connection with idler wheels 10 and 11. The idler wheels 10 and 11 are rotatably supported on an intermediate shaft 12. Clutches B and C, preferably hydraulically actuatable, are coordinated with the idler wheels 10 and 11. By means of said clutches B, C the gear changes can be carried out with improved gearshift quality under load without interruption of traction.

When the clutch B is engaged, the idler wheel 10 is non-rotatably connected to the intermediate shaft 12, and when the clutch C is engaged, the idler wheel 11 is non-rotatably connected with the intermediate shaft 12.

Another clutch A is parallel with the clutches B and C. The clutch A is also preferably hydraulically actuated; in the case described, the clutch A is used as a starting clutch. When the clutch A is engaged, the input shaft 4 is connected with the intermediate shaft 12 for transmitting driving power.

A fixed wheel 13 (shown to the right in the drawing) is non-rotatably connected with the intermediate shaft 12. The fixed wheel 13 belongs to the synchronized transmission 2. Thus, intermediate shaft 12 also forms the input shaft of the synchronized transmission 2. The fixed wheel 13 is in permanent meshing connection with another fixed wheel 14 on a countershaft 15. Other fixed wheels 16, 17 and 18 are non-rotatably situated on said countershaft next to the fixed wheel 14.

The fixed wheel 16—with a reversal of the direction of rotation—drives an idler wheel 20 via a reversing wheel 19. The idler wheel 20 is rotatably supported on an output shaft 21.

The fixed wheel 17 is in permanent tooth contact with an idler wheel 22 and the fixed wheel 18 is in permanent tooth contact with an idler wheel 23, both being likewise supported upon the output shaft 21.

Between the fixed wheel 13 and the idler wheel 20 and between the idler wheel 22 and the idler wheel 23, synchronization sets, designed in the usual manner and having synchronized gearshift clutches D, E, F and G, are situated. Said synchronized gearshift clutches D, E, F and G are positively locked gearshift elements of the synchronized transmission 2.

The clutches A, B and C of the powershift transmission 3 are preferably hydraulically actuatable. Said clutches can also be wet operating multi-disc clutches the slip of which can in addition be adjusted. If the slip of the clutches is adjusted, occurring torsion vibrations can be reduced. Therefore, special torsion absorbers or a dual mass flywheel can be eliminated. The clutch A is used as a starting clutch; it is preferably actuated by spring tension in an engaging direction and hydraulically disengaged against said spring tension. Therefore, a special parking brake can be omitted.

Figure 2:
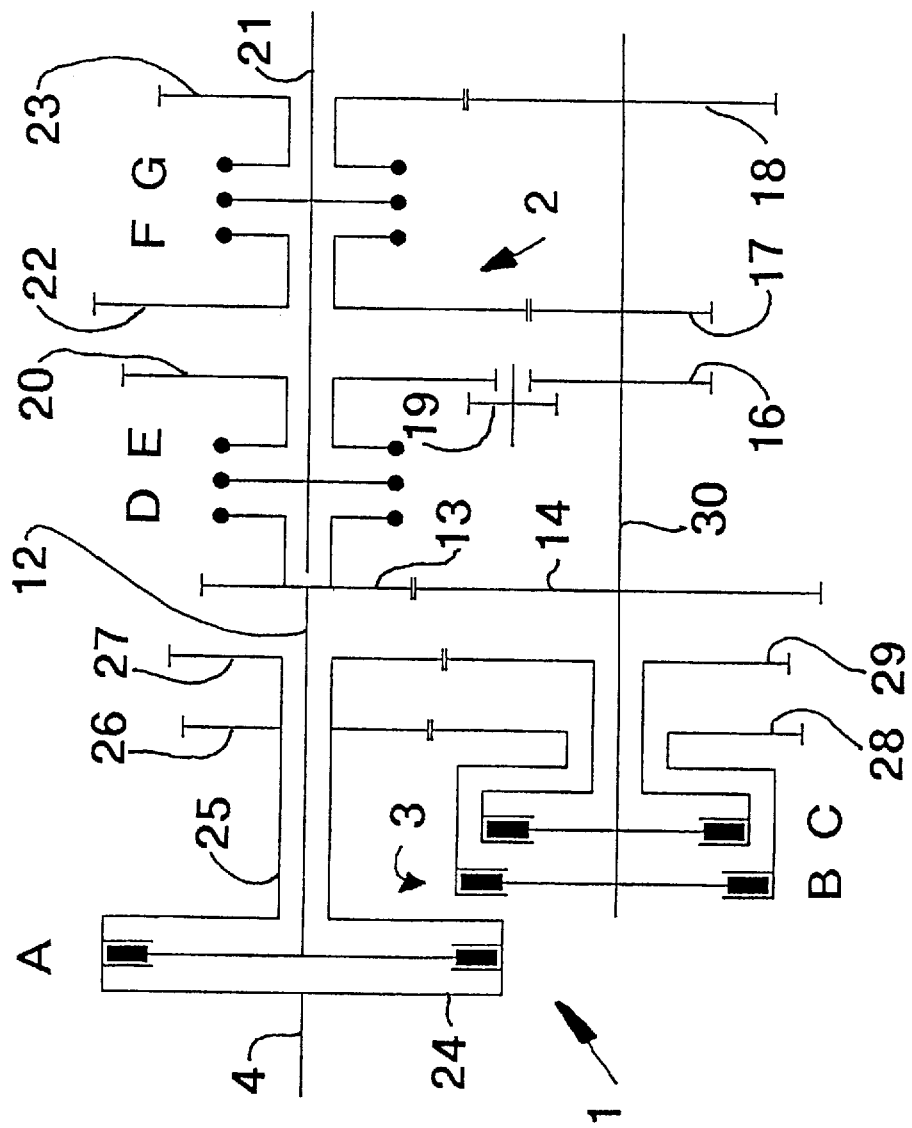
FIG. 2 is a transmission diagram of a second embodiment of a group transmission.

A group transmission 1, on which is based the transmission diagram of FIG. 2, does differ in constructional design from the group transmission of FIG. 1. Said group transmission 1 coincides, however, in being comprised of the synchronized transmission 2 as a basis and the powershift transmission 3.

In the powershift transmission 3, said construction differs from the one in FIG. 1 as follows:

The transmission input shaft 4 is non-rotatably connected, via a housing 24 of the clutch A, with a hollow shaft 25. The hollow shaft 25 carries fixed wheels 26 and 27. Fixed wheel 26 meshes with an idler wheel 28 coordinated with clutch B while fixed wheel 27 is meshed with an idler wheel 29 coordinated with the clutch C.

When the clutch B is engaged, the power flows via the fixed wheel 26 and the idler wheel 28 to a countershaft 30. Similarly, when the clutch C is engaged, the power flows via the fixed wheel 27 and the idler wheel 29 to the countershaft 30. It can be seen from the drawing that the countershaft 30 likewise belongs to the powershift 3 and the synchronized transmission 2.

Besides, when the clutch A is engaged, the power flows via the intermediate shaft 12 which is supported concentrically with the hollow shaft 25. The fixed wheel 13 of the intermediate shaft 12 also meshes here with the fixed wheel 14 which is here, however, non-rotatably connected with the countershaft 30. Otherwise, the construction coincides with the group transmission of FIG. 1. Therefore, the same numerals have been used for the same fixed or idler wheels situated on the countershaft 30 or the output shaft 21.

By virtue of the spatial arrangement of the clutches B and C, in a peripheral zone of the group transmission, they can be designed also as dry friction clutches. In this construction, good accessibility to the clutches B and C is of special advantage.

From the summary in table form in FIG. 3 can be seen—based on the individual gears 1 to 7 and the reverse gear R—the ratio (ratio of the angular velocity of the driving gear to the driven gear), the gear step (ratio of two adjoining ratios and the gearshift conditions of the clutches A, B and C, the same as of the synchronized gearshift clutches—gearshift elements D, E, F and G.

From the nine possible gears of the combined synchronized and powershift transmission, the gears with finer graduation of the powershift transmission and with rougher graduation of the synchronized transmission were selected:

| Gear | Ratio | Clutch | Gearshift member |
|---|---|---|---|
| 1 | i = 4.50 | A engaged | F actuated |
| 2 | i = 2.92 | C engaged | F actuated $\Phi_{12} = 1.54$ |
| 3 | i = 1.90 | A engaged | G actuated $\Phi_{23} = 1.53$ |
| 4 | i = 1.24 | C engaged | G actuated $\Phi_{34} = 1.54$ |
| 5 | i = 1.00 | A engaged | D actuated $\Phi_{45} = 1.24$ |
| 6 | i = 0.78 | B engaged | D actuated $\Phi_{56} = 1.28$ |
| 7 | i = 0.65 | C engaged | D actuated $\Phi_{67} = 1.20$ |

Gearshifts 1–2, 3–4, 5–6 and 6–7 occur in the powershift transmission while the gearshifts 2–3 and 4–5 occur both in the powershift and in the synchronized transmissions. The shifts of the overdrive gears 5–6 and 6–7 result automatically according to selected operation parameters.

By virtue of the overdrive gears automatically engageable and disengageable under load from the highest gear— the 5th gear in the described embodiment—a good gearshift quality is obtained. This makes an extraordinarily great comfort in driving noticeable.

The additional overdrive gears can be designed so that an economic drive consumption is ensured by reducing the engine speed. High speed limits are not exceeded here.

Figure 4:
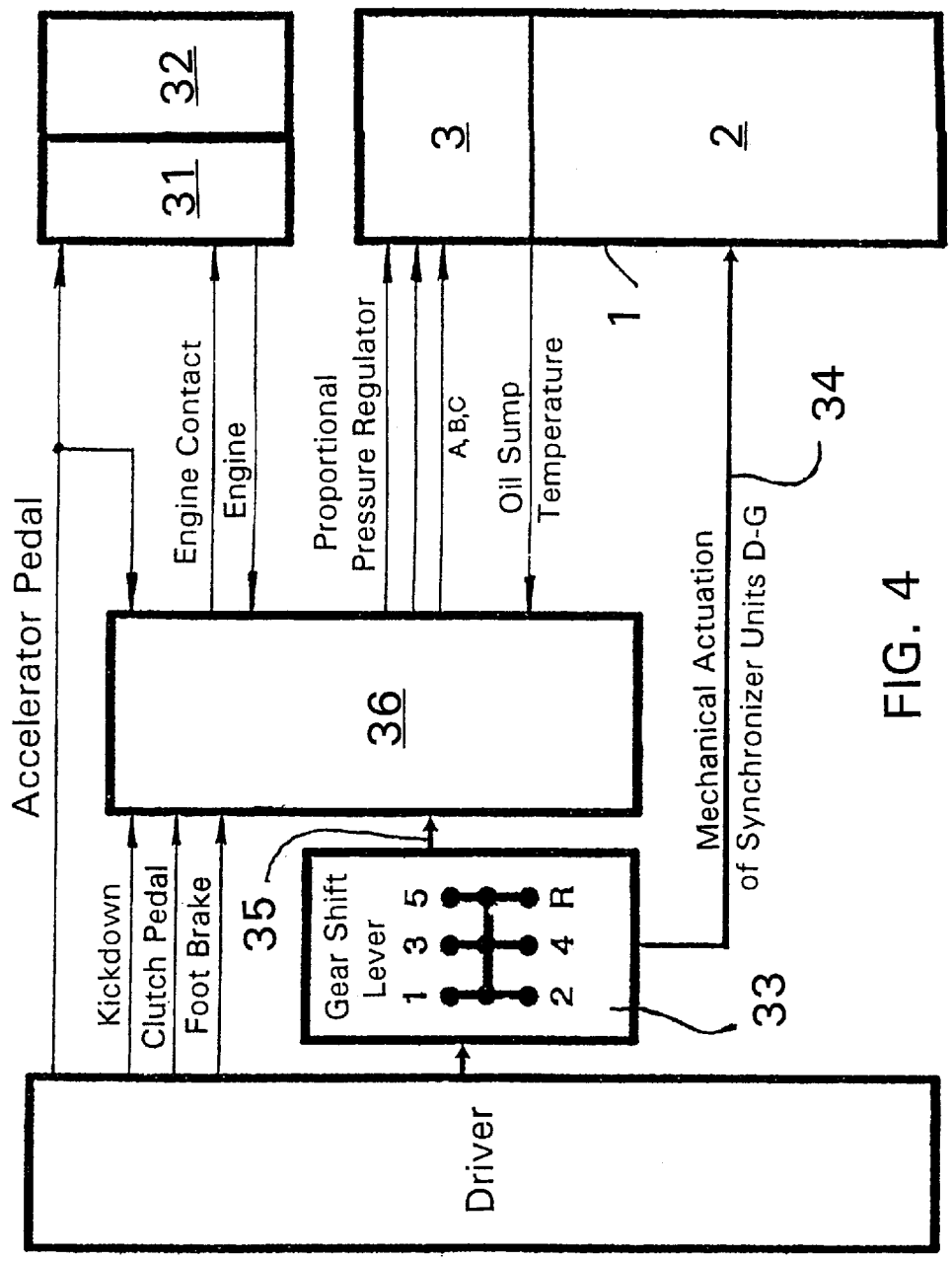
FIG. 4 is a possible embodiment of a transmission control making use of electronic transmission control and mechanical actuation elements.

FIG. 4 diagrammatically shows a possible design of a transmission control. The driver has several possibilities for communicating a desired power to an engine electronic system 31 of an engine 32 or to the group transmission 1. This purpose is mainly served by the accelerator (gas pedal, throttle valve position) and a gearshift lever 33 which acts upon the synchronized gearshift clutches D, E, F and G of the synchronized transmission 2 via a mechanical connection 34. A connection 35 to an electronic transmission control 36 is further available from the gearshift lever 33. By this connection, the actual position of the gearshift lever 33 is communicated to the electronic transmission control. The electronic transmission control 36 further receives input signals (for example, a kickdown position of the clutch pedal, a brake switch on/off, etc.) which are initiated by the driver. The engine electronic system 31 transmits important operation parameters of the engine to the electronic transmission control. There also results an answer-back signal to the electronic transmission control of the position and activity of the accelerator pedal. At the same time, the electronic transmission control also processes operation parameters of the group transmission 1, such as the oil sump temperature (for example, heat course program, cross-over control of the clutches A, B and C, etc.).

The synchronized gearshift clutches in the synchronized transmission 2 are actuated by the gearshift lever 33 which is actuated according to the usual gearshift pattern of a 5-gear transmission with a reverse gear. The clutches A, B and C, in the powershift transmission 3, are controlled in electro-hydraulic ways. The electronic transmission control 36 delivers position signals to proportional pressure regulators. The powershift of said clutches is effected, taking into consideration the position of the gearshift lever 33, the communicated desired power and the signals sent back by the engine electronic system 31 to the electronic transmission control. The electronic transmission control 36 primarily assumes the automatic engagement and disengagement of both overdrive gears, that is, it takes care of the periodic cycle control of the gearshift of the clutches A, B and C and of the adaptation of the pressure in the clutches to the torque to be transmitted. The advantages of an electronic system can be fully utilized in the engagement and disengagement of the overdrive gears. In particular it is possible to optimize the fuel consumption, the driveability, different conditions of use and the obtainable comfort in gearshifting.

It is obviously possible to modify the transmission control according to FIG. 4. The mechanical connection 34, for example, can be eliminated. The synchronized gearshift clutches of the synchronized transmission 2, for example, can be actuated by electric or a hydraulic auxiliary force and control can be exerted directly by the electronic transmission control 36. The synchronized gearshift clutches are preferably actuated by solenoid valves. From the synchronized transmission 2, signals are sent back to the electronic transmission control. These are, in particular, signals that represent the position of the gearshift rods of the synchronized clutches or also other information such as the output speed of the group transmission. It is in addition visually convenient to indicate to the driver the actual gearshift state of the group change-over transmission. This can be done, for example, by an LCD or an overhead display.

For certain driving situations, it is advantageous to prevent an upshift or downshift. An upshift, for example, can be omitted during mountain driving.

| Reference numerals | |
|---|---|
| 1 | group transmission |
| 2 | synchronized transmission |
| 3 | powershift transmission |
| 4 | input shaft |
| 5 | fixed wheel |
| 6 | fixed wheel |
| 7 | countershaft |
| 8 | fixed wheel |
| 9 | fixed wheel |
| 10 | idler wheel |
| 11 | idler wheel |
| 12 | intermediate shaft |
| 13 | fixed wheel |
| 14 | fixed wheel |
| 15 | countershaft |
| 16 | fixed wheel |
| 17 | fixed wheel |
| 18 | fixed wheel |
| 19 | reversing wheel |
| 20 | idler wheel |
| 21 | output shaft |
| 22 | idler wheel |
| 23 | idler wheel |
| 24 | clutch housing |
| 25 | hollow shaft |
| 26 | fixed wheel |
| 27 | fixed wheel |
| 28 | idler wheel |
| 29 | idler wheel |
| 30 | countershaft |
| 31 | engine electronic system |
| 32 | engine |
| 33 | gearshift lever |
| 34 | mechanical connection |
| 35 | connection |
| 36 | electronic transmission control |
| A | clutch |
| B | clutch |
| C | clutch |
| D | synchronized gearshift clutch |
| E | synchronized gearshift clutch |
| F | synchronized gearshift clutch |
| G | synchronized gearshift clutch |

It is claimed:

1. A group transmission (1) for a motor vehicle, said group transmission (1) comprising:

a synchronized transmission (2) having less than five gears, a synchronized input shaft, a synchronized countershaft (15), a synchronized output shaft (21) and a plurality of synchronized clutches arranged in a configuration to form said synchronized transmission; and, a powershift transmission (3), having a plurality of shafts, a plurality of gears and a plurality of powershift clutches arranged in a configuration to form said powershift transmission (3), and said powershift transmission (3) being sequentially arranged with said synchronized transmission (2) to transmit driving power of said group transmission (1);

wherein said group transmission (1) is formed by a connection of an output of said powershift transmission (3) to an input of said synchronized transmission (2) by at least an intermediate shaft (12) to from said group transmission (1), and the formed group transmission (1)

has at least five forward speeds and two additional forward overdrive speeds, and said two overdrive speeds are automatically engaged and disengaged when said synchronized transmission is manually shifted to a position which engages a gear with the highest ratio.

2. The group transmission according to claim 1, wherein said synchronized transmission (2) and said powershift transmission (3) each have three gears such that a manually shiftable five speed transmission is formed which has said two forward overdrive speeds.

3. The group transmission according to claim 2, wherein said powershift transmission (3) has a powershift countershaft (7), a head set is formed by a first fixed gear (5) supported by said powershift input shaft (4) and a first fixed gear (6) supported by said powershift countershaft (7); second and third fixed gears (8, 9) are supported on said powershift countershaft (7) and mesh with respective first and second idler gears (10, 11) supported on said intermediate shaft (12), said first and second idler gears (10, 11), respectively, are optionally connectable with said intermediate shaft (12) by second and third powershift clutches (B, C); and a first powershift clutch (A) is provided for connecting said powershift input shaft (4) directly with said intermediate shaft (12).

4. The group transmission according to claim 3, wherein said intermediate shaft (12) forms a portion of said synchronized input shaft of said synchronized transmission (2), and said intermediate shaft (12) supports a first fixed gear (13) which meshes with a first fixed gear (14) supported by said synchronized countershaft (15).

5. The group transmission according to claim 3, wherein said intermediate shaft (12) is non-rotatably connectable to an output shaft (21) of said synchronized transmission (2) by a first synchronized gearshift clutch (D).

6. The group transmission according to claim 3, wherein said three gears of said synchronized transmission (2) are formed by a first fixed gear (14) supported on said synchronized countershaft (15), a second fixed gear (17) supported on said synchronized countershaft (15), and a third fixed gear (18) supported on said synchronized countershaft (15); said first fixed gear (14) of said synchronized countershaft (15) meshes with a first fixed gear (13) of said intermediate shaft (12), and said second fixed gear (17) and said third fixed gear (18) of said synchronized countershaft (15), respectively, mesh with second and third idler gears (22, 23) which are rotatably supported on said output shaft (21).

7. The group transmission according to claim 6, wherein said first fixed gear (13) of said intermediate shaft (12), a first idler gear (20) of said output shaft (21), said second idler gear (22) of said output shaft (21) and said third idler gear (23) of said output shaft (21) are respectively non-rotatably connectable with said output shaft (21) by a first synchronized gearshift clutch (D), a second synchronized gearshift clutch (E), a third synchronized gearshift clutch (F), and a fourth synchronized gearshift clutch (G).

8. The group transmission according to claim 2, wherein said powershift input shaft (4) is non-rotatably connectable with a hollow shaft (25) by a housing (24) of a first powershift clutch (A) to supply drive directly to said intermediate shaft (12); said hollow shaft (25) supports first and second hollow shaft fixed gears (26, 27) which mesh with first and second group transmission idler gears (28, 29) supported on a group transmission countershaft (30) of said group transmission (1); said first and second group transmission idler gears (28, 29), respectively, are optionally connectable with said group transmission countershaft (30) by second and third powershift clutches (B, C).

9. The group transmission according to claim 8, wherein group transmission countershaft (30) supports a first fixed gear (14), a second fixed gear (17) and a third fixed gear (18), said first fixed gear (14) of said group transmission countershaft (30) meshes with a first fixed gear (13) of said intermediate shaft (12), and said second fixed gear (17) of said group transmission countershaft (30) and said third fixed gear (18) of said group transmission countershaft (30) mesh with second and third idler gears (22, 23) which are rotatably supported by said output shaft (21) and respectively engaged by a third synchronized gearshift clutch (F) and a fourth synchronized gearshift clutch (G).

10. The group transmission according to claim 8, wherein said second and third powershift clutches (B, C) are dry friction clutches.

11. The group transmission according to claim 3, wherein said five manually shiftable gears of said group transmission (1) are manually selectable via a gearshift lever (33) and said first synchronized gearshift clutch (D), said second synchronized gearshift clutch (E), said third synchronized gearshift clutch (F), and said fourth synchronized gearshift clutch (G) of said synchronized transmission (2) are shifted via a mechanical connection (34).

12. The group transmission according to claim 11, wherein said first, second and third powershift clutches (A, B and C) of said powershift transmission (3) are electro-hydraulically shiftable clutches.

13. The group transmission according to claim 1, wherein said two overdrive gears are automatically engaged and disengaged, according to specific operational parameters, by an electronic transmission control (36).

14. The group transmission according to claim 3, wherein the manually selectable gear with the highest ratio and said two forward overdrive gears are shifted by said first powershift clutch (A), said second powershift clutch (B), and said third powershift clutch (C) of said powershift transmission (3) of said group transmission (1) when a fourth synchronized gearshift clutch (D) is engaged.

15. The group transmission according to claim 3, wherein said first powershift clutch (A), said second powershift clutch (B) and said third powershift clutch (C) are wet operating multi-disc clutches which have adjustable slip.

16. The group transmission according to claim 7, wherein said synchronized countershaft (15) supports a fourth gear (16) which meshes, via a reversing gear (19), with a fourth idler gear (20) rotatably supported on said output shaft (21), and when said second synchronized gearshift clutch (E) is engaged a reverse drive is supplied to said output shaft (21).

17. The group transmission according to claim 9, wherein said synchronized countershaft (15) supports a fourth gear (16) which meshes, via a reversing gear (19), with a fourth idler gear (20) rotatably supported on said output shaft (21), and when said second synchronized gearshift clutch (E) is engaged a reverse drive is supplied to said output shaft (21).

18. A group transmission (1) for a motor vehicle, said group transmission (1) comprising:

a synchronized transmission (2) having less than five gears, an input, a synchronized countershaft (15), a synchronized output shaft (21) and a plurality of synchronized clutches arranged in a configuration to form said synchronized transmission; and, a powershift transmission (3), having a plurality of shafts, a plurality of gears and a plurality of powershift clutches arranged in a configuration to form said powershift transmission (3), and said powershift transmission (3) being sequentially arranged with said synchronized transmission (2) to transmit driving power of said group transmission (1);

wherein said group transmission (1) is formed by a connection of an output of said powershift transmission (3) to an input of said synchronized transmission (2) by at least an intermediate shaft (12) to from said group transmission (1), and the formed group transmission (1) has at least five forward speeds and two additional forward overdrive speeds, and said two overdrive speeds are automatically engaged and disengaged when said synchronized transmission is manually shifted to a position which engages a gear with the highest ratio; said five manually shiftable gears of said group transmission (1) are manually selectable via a gearshift lever (33) and said two overdrive gears are automatically engaged and disengaged, according to specific operational parameters, by an electronic transmission control (36) coupled to said group transmission (1).

* * * * *